(12) United States Patent
Lee

(10) Patent No.: US 8,780,548 B2
(45) Date of Patent: Jul. 15, 2014

(54) DOCKING STATION WITH ROTATION MECHANISM

(75) Inventor: Johann Lee, Syosset, NY (US)

(73) Assignee: CBY Holdings, LLC, Boston, MA (US)

( * ) Notice: Subject to any disclaimer, the term of this patent is extended or adjusted under 35 U.S.C. 154(b) by 259 days.

(21) Appl. No.: 13/120,781

(22) PCT Filed: Sep. 24, 2009

(86) PCT No.: PCT/US2009/058180
§ 371 (c)(1),
(2), (4) Date: Mar. 24, 2011

(87) PCT Pub. No.: WO2010/036780
PCT Pub. Date: Apr. 1, 2010

(65) Prior Publication Data
US 2011/0170256 A1     Jul. 14, 2011

Related U.S. Application Data

(60) Provisional application No. 61/100,147, filed on Sep. 25, 2008.

(51) Int. Cl.
*G06F 1/16* (2006.01)
*F16M 11/10* (2006.01)

(52) U.S. Cl.
CPC ............ *G06F 1/1632* (2013.01); *G06F 1/1616* (2013.01); *G06F 1/1626* (2013.01); *G06F 1/166* (2013.01); *F16M 11/10* (2013.01)
USPC .................. 361/679.44; 361/679.41

(58) Field of Classification Search
CPC ... G06F 1/1632; G06F 1/1616; G06F 1/1626; G06F 1/166; F16M 11/10
USPC .......................... 361/679.44, 679.41
See application file for complete search history.

(56) References Cited

U.S. PATENT DOCUMENTS

| 6,196,850 | B1  | 3/2001 | Dietz |
| 6,716,058 | B2* | 4/2004 | Youn ............................. 439/535 |
| 6,737,829 | B2  | 5/2004 | Sastry |
| 6,856,506 | B2  | 2/2005 | Doherty |
| 7,352,567 | B2* | 4/2008 | Hotelling et al. ........ 361/679.55 |

(Continued)

FOREIGN PATENT DOCUMENTS

| JP | 58-182965 A   | 10/1983 |
| JP | 2007-523433 A | 8/2007 |

(Continued)

OTHER PUBLICATIONS

International Search Report for International Application No. PCT/US2009/058180 dated Nov. 17, 2009.

(Continued)

*Primary Examiner* — Lisa Lea Edmonds
(74) *Attorney, Agent, or Firm* — Neal Gerber & Eisenberg LLP

(57) ABSTRACT

A docking station for a portable electronic device is provided. The docking station comprises (a) an engagement element, wherein the engagement element is capable of engaging the said portable electronic device; and (b) a rotation mechanism, wherein the rotation mechanism is capable of rotating said portable electronic device relative to a support base of said docking station.

9 Claims, 7 Drawing Sheets

(56) References Cited

U.S. PATENT DOCUMENTS

| | | | |
|---|---|---|---|
| 7,479,902 B2 * | 1/2009 | Wang et al. | 341/22 |
| 7,580,254 B2 * | 8/2009 | Anderson | 361/679.41 |
| 7,580,255 B2 * | 8/2009 | Crooijmans et al. | 361/679.56 |
| 7,738,238 B2 * | 6/2010 | Liu | 361/679.01 |
| 7,808,779 B2 * | 10/2010 | Lum et al. | 361/679.43 |
| 7,916,468 B2 * | 3/2011 | Takizawa | 361/679.44 |
| 7,952,569 B2 * | 5/2011 | Hunt et al. | 345/179 |
| 8,159,818 B2 * | 4/2012 | Riddiford | 361/679.41 |
| 2007/0035917 A1 * | 2/2007 | Hotelling et al. | 361/683 |
| 2007/0097689 A1 | 5/2007 | Barausky | |
| 2007/0247794 A1 * | 10/2007 | Jaffe et al. | 361/681 |

FOREIGN PATENT DOCUMENTS

| | | |
|---|---|---|
| JP | 2008-160794 A | 7/2008 |
| JP | 2008-527846 A | 7/2008 |
| WO | WO 2007/100989 A2 | 9/2007 |

OTHER PUBLICATIONS

Office Action received on Nov. 13, 2012 for Japanese Application No. 2011-529217.

* cited by examiner

DOCKING STATION WITH ROTATION MECHANISM

CROSS-REFERENCE TO RELATED APPLICATION

This application claims the benefit of U.S. Provisional Application Ser. No. 61/100,147, filed Sep. 25, 2008. The entire disclosure of that application is incorporated by reference as if set forth fully herein.

BACKGROUND OF THE INVENTION

Portable electronic devices such as DVD players, radios, cassette recorders, CD players, personal media players such as Coby Electronics' PMP 4320 portable media player, and digital music replay (MP3) devices such as Apple's iPod MP3 player enable users to receive transmissions or to play content essentially wherever and whenever they want. Accordingly, users may enjoy these devices at home, when they travel and either hold them, clip them to their clothing, or associate them with a docking station.

When a portable electronic device is associated with a docking station a user may enjoy the output of his or her device while having free hands and obtain a higher quality sound by connecting the portable electronic device to a set of speakers that is housed within the docking station. Unfortunately, to date the primary focus of improving docking stations has been on the sound quality, and there have been few other efforts to optimize other features of docking stations to improve the user's experience. As portable electronic devices acquire increased functionalities, e.g. higher quality video features, consumers will continue to demand more enjoyable ways in which to use their devices. The present invention is directed to this need.

SUMMARY OF THE INVENTION

The present invention is directed to a docking station for portable electronic devices such as an iPod. The docking station has the feature of being able to rotate the portable electronic device relative to the support base of the docking station. Further, in some embodiments, the docking station has additional features such as a clock with or without an alarm feature, and a backlight or other illumination feature.

In one embodiment, the present invention is directed to a docking station for a portable electronic device wherein the docking station comprises: (a) an engagement element, wherein the engagement element is capable of engaging the portable electronic device; and (b) a rotation mechanism, wherein the rotation mechanism is capable of rotating the portable electronic device relative to a support base of the docking station. The present invention also provides methods for using this docking station.

DETAILED DESCRIPTION OF THE INVENTION

Figure 1A:
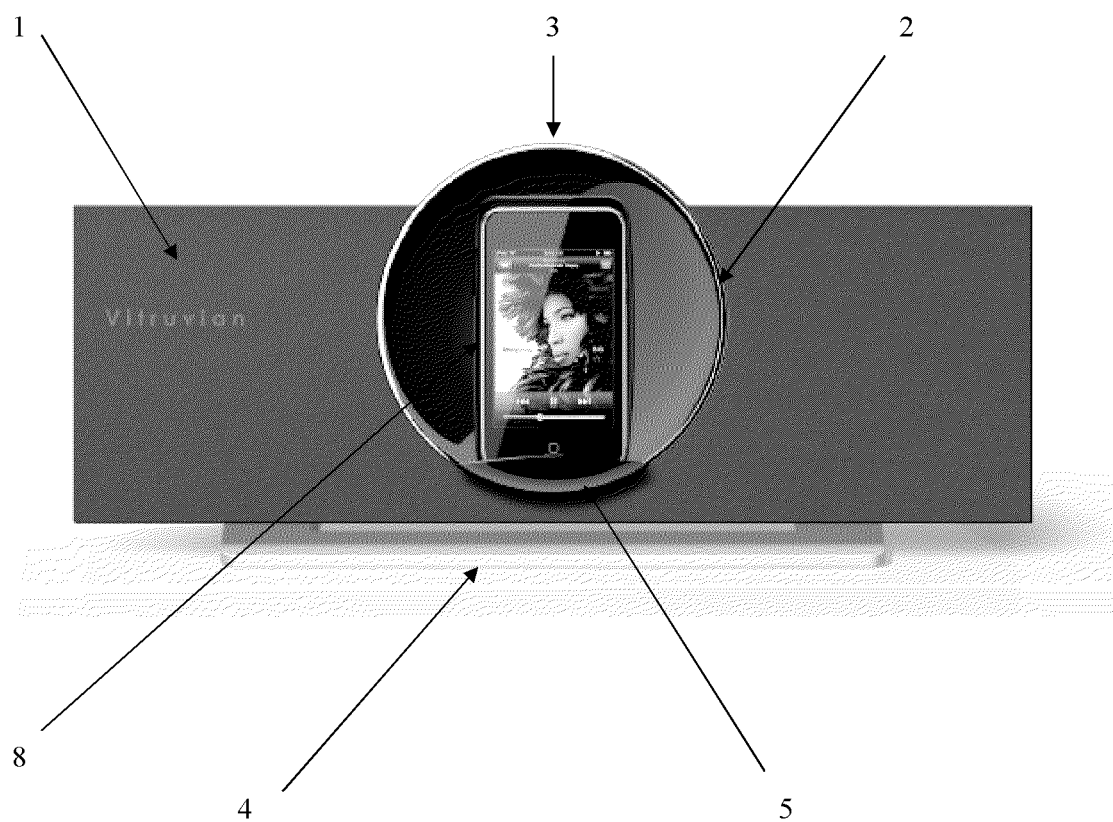
FIG. 1A is a representation of an embodiment of the present invention, wherein a portable electronic device is engaged by a docking station and is oriented in a portrait position.

Any of the features of the various embodiments described herein can be used in conjunction with features described in connection with any other embodiments disclosed unless otherwise specified or apparent from context. Accordingly, features described in connection with the various or specific embodiments are not to be construed as not suitable in connection with other embodiments disclosed herein unless such exclusivity is explicitly stated or implicit from context.

According to one embodiment, the present invention is directed to a docking station for a portable electronic device, wherein the docking station comprises: (a) an engagement element, wherein the engagement element is capable of engaging the portable electronic device; and (b) a rotation mechanism, wherein the rotation mechanism is capable of rotating the portable electronic device relative to a support base of the docking station.

The portable electronic device may be any device that a user wishes to reversibly associate with the docking station and that is capable of generating audio, visual or audiovisual outputs. The portable electronic device may, for example, be a portable media player. Examples of portable electronic devices include but are not limited to Apple's iPod and portable electronic devices made by Palm.

The engagement element is the portion of the docking station that permits the portable electronic device to be reversibly associated with it and may be situated in a structure that is referred to as a docking base that has a capability of supporting the engagement element. The phrase "reversibly associated" means being able to associate and disassociate a plurality of times without negatively impacting the function of either the docking station or the portable electronic device. By way of non-limiting examples, the engagement element may comprise one or more of the following: a female or male end of a snap, an outer casing or an inner surface of a receptacle for the outer casing for a USB connection, a pin or plug, prongs, magnets, and/or either the latches or hooks of a latch and hook system (e.g., Velcro). Whatever system is employed on the docking station, the reciprocal element should be part of the portable electronic device.

The engagement element may in some embodiments comprise or consist of a communication link, which is an interconnection over which data is transferred. Examples of communication links that may be part of the engagement element (or form the engagement element) include, but are not limited to one or more of electric wire, cable and optical fibers. In other embodiments, the communication link is present, but is not part of the engagement element, for example, wireless technology or a non-wireless technology that permits the exchange of information, but that may or may not create a sufficiently strong association between the docking station and portable electronic device to retain their association absent and additional means by which to maintain the association. In some embodiments, the engagement element is a USB port that also serves as a communication link.

In addition to a communication link, there may also be a power connection such that the portable electronic device may draw electricity through the power connection. The electricity may provide the source of energy for the portable electronic device to function, and/or to charge its batteries. The source of the energy may, for example, be batteries within the docking station or an external source to which the docking station is connected.

As persons of ordinary skill in the art are aware, many portable electronic devices contain rectangular or substantially rectangular digital screens. Some of these portable electronic devices are designed to recognize when they are being held in a portrait or landscape orientation. A "portrait" position or orientation is one in which a width dimension of a face is parallel or at least substantially parallel to the horizontal plane. A "landscape" position or orientation is one in which a length dimension of a face is parallel or at least substantially parallel to the horizontal plane. As used herein, the length dimension is defined as the dimension of the front face that is longer than the other dimension of the front face, which is the width dimension. Additionally, as persons who use portable electronic devices are aware, the device can be used while the viewing face is being tilted forward or backward yet still having either the width or the length of the device being at least substantially parallel to the horizontal plane.

In some configurations when the device is held in a portrait orientation, as a user moves it to the landscape position, and after a face of the device is rotated a predetermined number of degrees, e.g., 45 degrees or more relative to the starting position, the device will automatically switch the display from portrait to landscape.

In some embodiments, the docking station of the present invention may be configured such that when not in use or when initially used, it is in a first position that is able to receive the portable electronic device in an orientation that enables it to display a portrait image. To facilitate this, the engagement element may be located at the bottom of a turning table. (Alternatively, the default position may be such that it is initially capable of receiving the portable electronic device in an orientation that enables it to display a landscape image.)

If a user wishes to rotate the portable electronic device, when engaged by the docking station he or she may activate a rotation mechanism thereby causing a turning table and engagement element to rotate to a second position that is for example 90 degrees relative to the first position. The phrase "turning table" refers to a portion of the rotation mechanism that rotates when the portable electronic device rotates. The rotation may be either clockwise or counterclockwise. In some embodiments, the docking station is configured to rotate only over a predetermined sector, e.g. it may be configured to rotate from a resting state counter-clockwise for 90 degrees and then when appropriately activated, rotate back in a clockwise direction over the same 90 degrees. In other embodiments the docking station is configured to rotate only clockwise 90 degrees from an initial state, and when appropriately activated to rotate back counter-clockwise by 90 degrees. In other embodiments the user may have a choice whether to move, for example, from an initial portrait position to a landscape position by going clockwise or counter-clockwise. If the portable electronic device is engaged by the engagement element, then it too would rotate with the engagement element and turning table.

The turning table may for example be an element that when a user looks at the device is partially obscured by the portable electronic device when the portable electronic device is engaged by the engagement element. The turning table may be any regular or irregular shape, e.g., circle, square, triangle oval, ellipse, etc. Additionally, the docking station may be designed such that when the portable electronic device is engaged, its rear side contacts the turning table, or there may be some space between the rear side of the portable electronic device and the docking station, e.g., less than 1 cm, less than 9 mm, less than 8 mm, less than 7 mm, less than 6 mm, less than 5 mm, less than 4 mm, less than 3 mm, less than 2mm or less than 1 mm.

In some embodiments, the front face of the turning table has a flat or substantially flat surface that is oriented between 30 and 90 degrees relative to the horizontal plane. In some embodiments, the front face of the turning table has a flat or substantially flat surface that is oriented between 40 and 80 degrees relative to the horizontal plane. In some embodiments, the front face of the turning table has a surface that is oriented between 50 and 70 degrees from the horizontal plane. In some embodiments, the front face of the turning table has a surface that is oriented between 70 and 90 degrees from the horizontal plane. In some embodiments, the face of the turning table may be concave. If the turning table is at an angle relative to the horizontal, the docking station may be configured such that the engagement element causes the portable electronic device to be situated at the same angle.

The rotation mechanism may be activated by an input element that causes the rotation mechanism to cause movement of a turning table from a first position to a second position. The input element may for example be a single button that causes the rotation element to move from in whatever position currently exists to the other position. Alternatively there may be separate input elements for each of the positions or there may be a switch that can be moved between the two or more positions. Further, although in some embodiments, there are only two possible positions, in other embodiments there are three, four, five, six or more possible positions at which the turning table may stop. The input mechanism may also be a graphic user interface such as a touch screen.

It is also possible to design the docking station's rotation mechanism to be configured to orient the personal electronic device at other orientations relative to a first position such as a first vertical (or portrait position). By way of example these other orientations may be about 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, 170 degrees, 175 degrees, or 180 degrees. The docking station may also be designed such that the range of motion is limited to a subset of the positions, for example it may rotate for a starting to position to one more positions between 45 and 135 degrees, between 45 and 90 degrees, between 75 and 105 degrees, between 80 and 100 degrees, and between 85 and 95 degrees relative to an initial position.

When the docking station is designed to enable positioning of the device in a plurality of orientations, there must be a means by which to control the rotation mechanism to cease rotation when it reaches other positions. This may be accomplished by any method that is now known or that comes to be known and that a person of ordinary skill in the art would appreciate as useful in connection with the present invention, including but not limited to a dial or touch screen.

As noted above, in some applications there will be only the binary conditions of positioning the personal electronic device in one of two positions. When there is a button for causing the rotation between the two positions, in some embodiments the rotation mechanism remains locked in one of those positions until an activation button is pressed again. Thus, there may be resistance to attempts for physical manipulation rotation of the turning table by hand. Alternatively, in some embodiments, the turning table may be moved by putting a physical force on a handle and moving it. Accordingly, rotation may be controlled by physical forces and/or electronic circuits.

Regardless of how many different possible positions exist at which the turning table may cease moving, personal electronic devices may be rotated by any of the many well known methods for rotating items a fixed number of degrees, including but not limited to the use of a motorized mechanism and/or gears, which as noted above may for example be activated by a push button. The speed of rotation may be defined by the motorized mechanism. By way of example, the time for moving from a first position to a second position that is ninety degrees from the first position may be less than 30 seconds, less than 25 seconds, less than 20 seconds, less than 15 seconds, less than 10 seconds, less than 5 seconds or less than 3 seconds.

Additionally although in some embodiments the turning table rotates with the engagement element, in other embodiments, the device is designed such that the engagement element and its associated support rotates the desired number of degrees along a circumference of for example a round element.

The docking station may also comprise a support base. The support base refers to the portion of the docking station that does not rotate. Thus, the support base is the portion of the docking station relative to which the rotation mechanism causes rotation to occur. Within the support base may, for example, be the components for receiving the data that will enable the projection of the sound as desired by the user. The support base may also be within a housing that contains both the structural elements to give the support base the desired shape, as well as, the components needed to effectuate a clock display if present, an alarm function if present, any illumination features if present, and any central processing unit that contains the instructions needed to effectuate any of the functionalities described herein. Furthermore, the central processing unit is also preferably operably coupled to each of the components needed to effectuate the desired functionality.

As noted above, preferably the docking station of the present invention also comprises a port for a communication interface with the portable electronic device. The communication interface may be a link that permits the exchange of information between the docking station and the portable electronic device. In some embodiments, the port serves a dual function of the engagement element and the communication of data to the personal electronic device. In other embodiments, there is a separate engagement element in addition to the communication port. For example, there may be a USB port located in an engagement support structure. Through the USB port the docking station and the portable electronic device both retain association due to the resistance when they are engaged and communicate.

The docking station may further comprise one or more stabilization elements for stabilizing the portable electronic device. The stabilization element is particularly useful when the device has been rotated more than forty-five degrees, e.g., 90 degrees from the first portrait position. In one embodiment the stabilization element is a peg that protrudes from the plane of the turning table and is located in a position such that the portable electronic device, when engaged by the docking base touches the peg or its closest point is less than 5 mm or less than 4 mm or less than 3 mm or less than 2 mm or less than 1 mm from it. If the docking station is designed to rotate counterclockwise, then preferably at least one stabilization peg is situated on the left half of the turning table such that when the turning table is rotated from a portrait orientation to a landscape orientation, the peg would then be below the portable electronic device. Similarly, if the docking station is designed to rotate clockwise, then preferably at least one stabilization peg is situated on the right half of the turning table such that when the turning table is rotated the peg would then be below the portable electronic device. In some embodiments there is at least one stabilization element positioned to be on each side of the portable electronic device. Should the portable electronic device become disassociated from the engagement element, the stabilization element would prevent it from falling (or from falling more than the distance between the device and the stabilization element) and becoming damaged.

The docking station may also be configured to comprise a light illumination element. The light illumination element may have the capabilities of displaying lights in response to volume and/or tempo or auditory output such as music. The light illumination element may be part of the turning table and/or part of some or all of the remaining portion of the docking station. Technologies for light displays in response to music are well known to persons of ordinary skill or may for example be implemented through the use of a mini-computer chip.

In one embodiment, the docking station comprises a two-channel speaker system, a motorized rotating dock console for watching videos on for example an iPod touch, iPhone, Nano and other similar portable electronic devices. It also may comprise illuminating dimming lights that respond to music, buttons for power, volume, light and rotation, an input mechanism, and an iPod 30-pin connector as well as an auxiliary input and a DC input. The output power may, for example, be 20-60 W or 30-50 W or 40 W and the unit dimensions may for example be 16×7.4×4.55 inches +/−0.5 inches or 1 inch in any dimension.

In some embodiments there is also a remote control and an AC adaptor.

In some embodiments, the docking station comprises a speaker or a plurality of speakers. Furthermore it may comprise a sound grill to improve sound quality.

The present invention may be better understood by reference to the figures. In FIG. 1A, there is shown a docking base, 5, which may provide for or contain an engagement element to retain association with the portable electronic device 8. In or associated with the docking base there may also be a communication interface in the form of, for example, pins of an appropriate number that permit communication between the electronic device and the docking station.

The turning table seen behind the personal electronic device is capable of displaying light illumination 2. The docking station also has at least one speaker 1 for projecting sound, and a stand 4. Atop of the docking station is button to cause the console (rotation mechanism) to turn 3. Here the portable electronic device is in a portrait orientation.

Figure 1B:
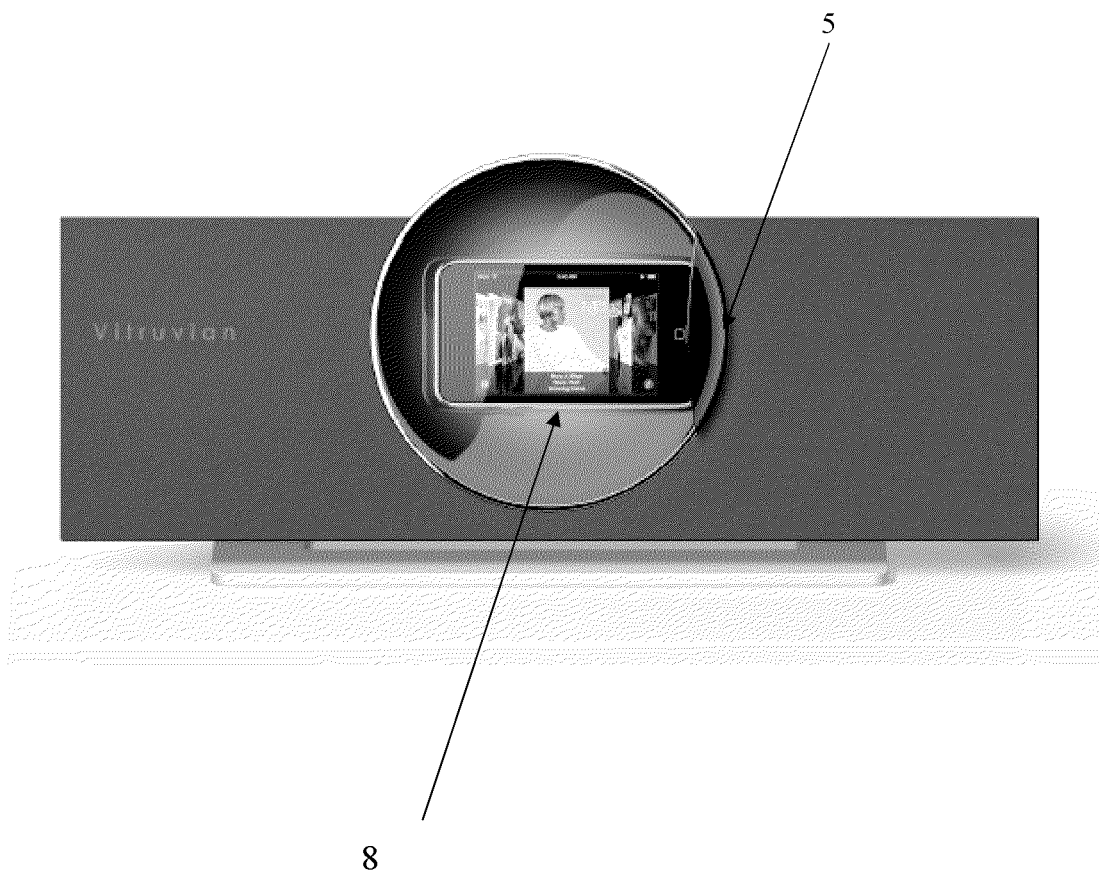
FIG. 1B is a representation of an embodiment of the present invention, wherein a portable electronic device is engaged by a docking station and is oriented in a landscape position.

FIG. 1B shows that same docking station with the turning table, personal electronic device 8 and docking base 5 that contains an engagement element with the personal electronic device rotated 90 degrees from the orientation shown in FIG. 1A. In FIG. 1B a portable electronic device is in a landscape orientation.

Figure 2:
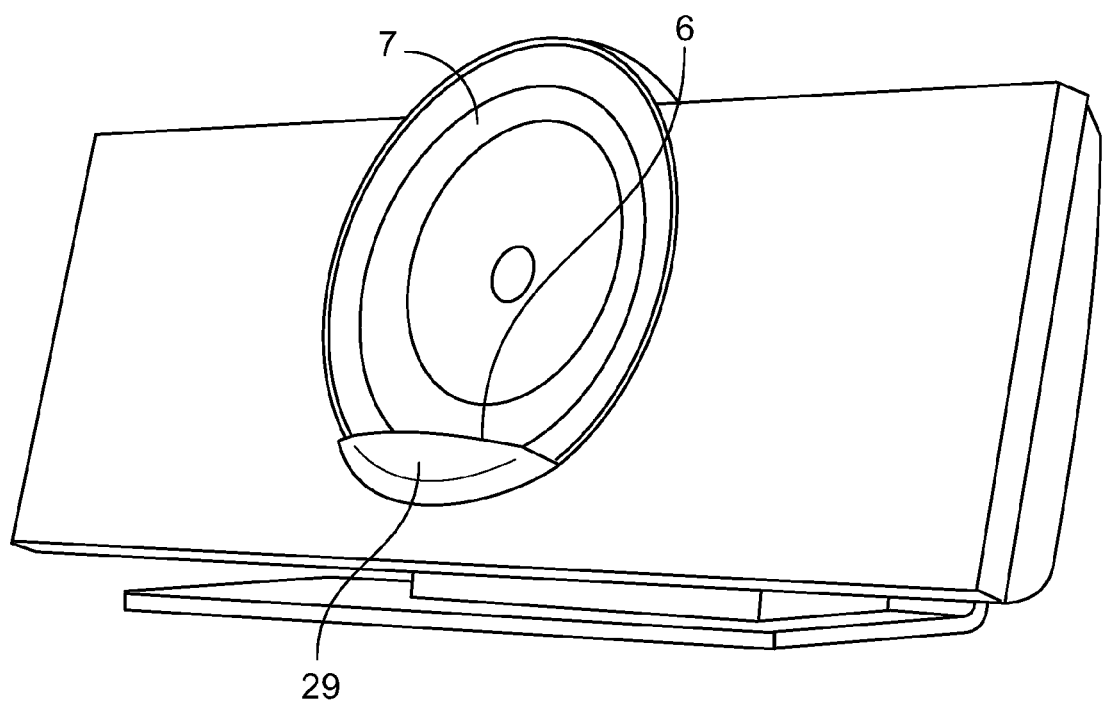
FIG. 2 is a representation of an embodiment of the present invention without a portable electronic device.

FIG. 2 shows a docking station without the portable electronic device. The docking base 6 appears at the bottom of the turning table, and the stabilization element 7 appears on the left portion of the turning table.

Figure 3:
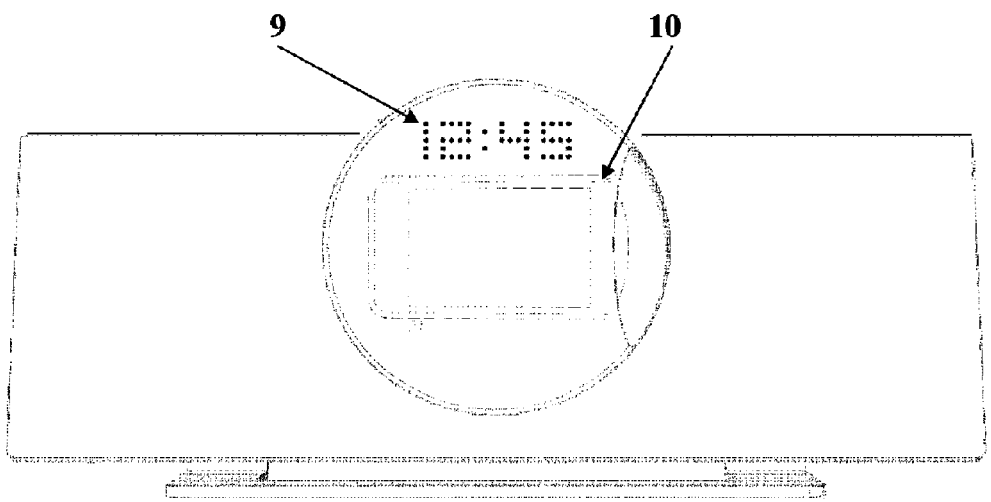
FIG. 3 is a representation of an embodiment of the present invention in which the docking station has a clock display.

FIG. 3 shows a docking station of an embodiment of the present invention that further comprises a clock display 9. The clock display in FIG. 3 is formed by a plurality of lights that may be controlled by a central processing unit of the docking station. The output of the clock display may rely on an internal clock of the docking station or a clock housed within the portable electronic device. In some embodiments, the clock display of FIG. 3 becomes active only when as shown in the figure, the portable electronic device 10 has been engaged and is displaced (i.e., rotated) a threshold number of degrees, e.g., at least 10 degrees, at least 20 degrees, at least 30 degrees, at least 40 degrees, at least 50 degrees, at least 60 degrees, at least 70 degrees, at least 80 degrees or at least 90 degrees, or exactly any of the aforementioned degree points.

Figure 4:
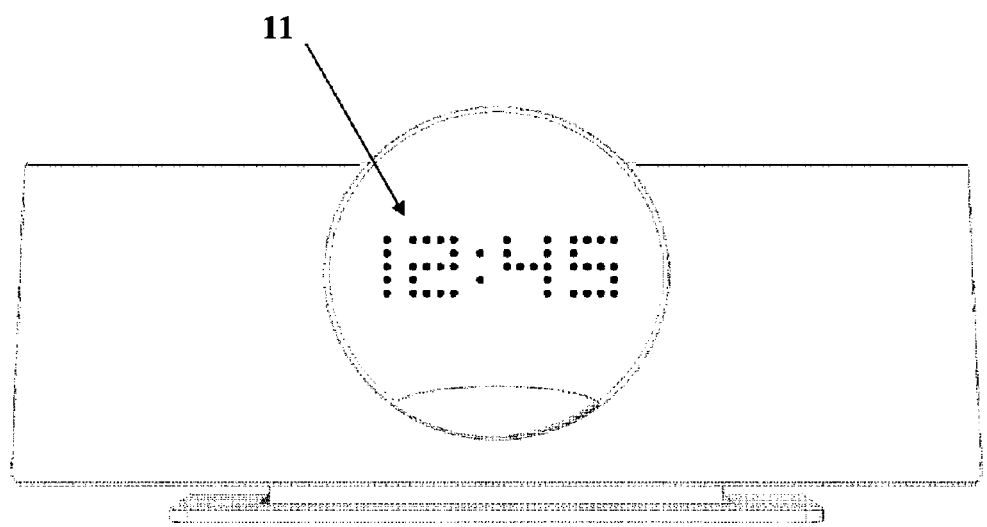
FIG. 4 is a representation of another embodiment of the present invention in which the docking station has a clock display.

In FIG. 4, the device has a different clock display 11. The clock display function of FIG. 4 may be a feature that exists in addition to or instead of the clock display feature of FIG. 3. As FIG. 4 shows, the digital clock display appears in an orientation that exists for the docking station when the portable electronic device is not engaged and the engagement element is horizontal. As shown in FIG. 4, the clock display covers an area that would be partially covered by the portable electronic device, were that device engaged. The docking station may be designed such that the clock only displays when there is no engagement of the electronic device and the docking station.

In some embodiments, the docking station has exactly two or at least two clock display features such that there is a display of time as in FIG. 4 when there is no engagement with an electronic device, and a clock display of FIG. 3 when there is engagement of an electronic device and a rotation of a designated number of degrees or range of degrees. Further, the central processing unit of the docking station may contain one or more algorithms that cause a switch of a clock display at a predestinated number of degrees, e.g., when the rotation element has rotated 30 degrees or 35 degrees or 40 degrees or 45 degrees or 50 degrees or 55 degrees or 60 degrees or 65 degrees or 70 degrees.

Figure 5:
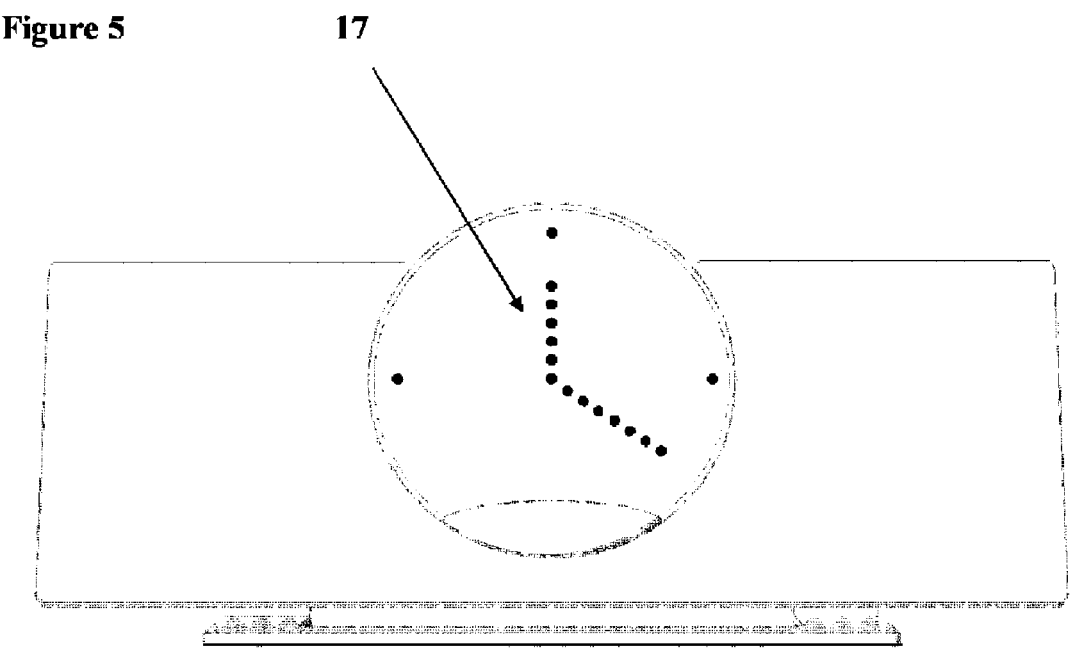
FIG. 5 is a representation of another embodiment of the present invention in which the docking station has a clock display.

FIG. 5 like FIG. 4 shows a clock display that would be visible when no electronic device is engaged. However, the time 17 is displayed in a manner that creates the illusion of an analog clock rather than a digital display as in the previous two figures. This display feature can be an option that exists in addition to that of FIG. 4 such that the user may choose the means of display that he or she wants, including a choice of no display. Alternatively, the display of the clock as in FIG. 5 may exists exclusive of that of FIG. 4, and either in combination with or not in combination with that of FIG. 3.

Any of the aforementioned clock features may be coupled with an alarm feature, and/or a snooze feature.

Figure 6:
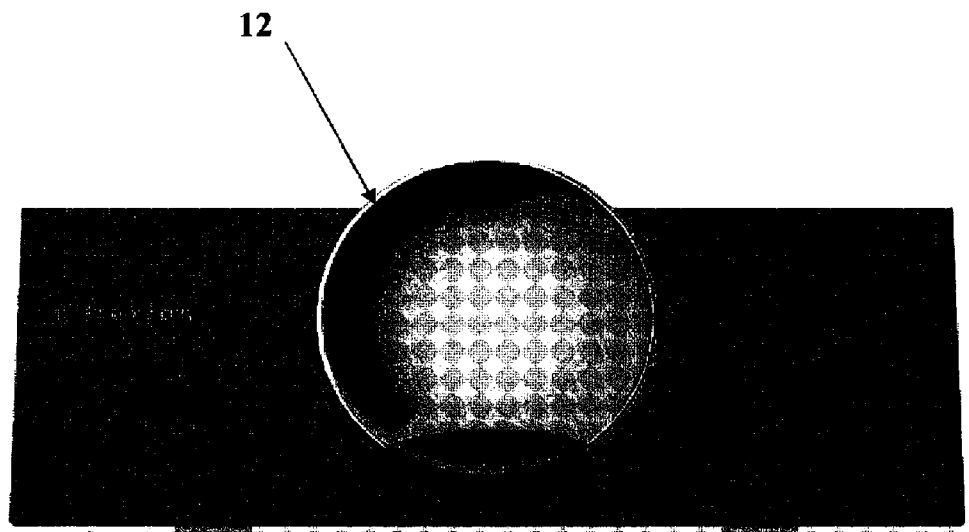
FIG. 6 is a representation of an embodiment of the present invention in which back lighting is shown.

FIG. 6 shows an embodiment of the present invention in which there is a back light 12 that is visible around the perimeter of the rotation element. In some embodiments, this is in an optional or default continuous display mode. In some embodiments, there is a light display functionality that randomly displays light images of one or more colors. In some embodiments, there is a light display functionality that displays light images of one or more colors in response to the audio track or signals emitting from the electronic device, for example it may respond to the beat.

When the light display is dependent upon the sound of the electronic device, the data from the electronic device may be transmitted through the communication link to the central processing unit of the docking station. That central processing unit may execute a series of commands that causes the display a light pattern.

Figure 7:
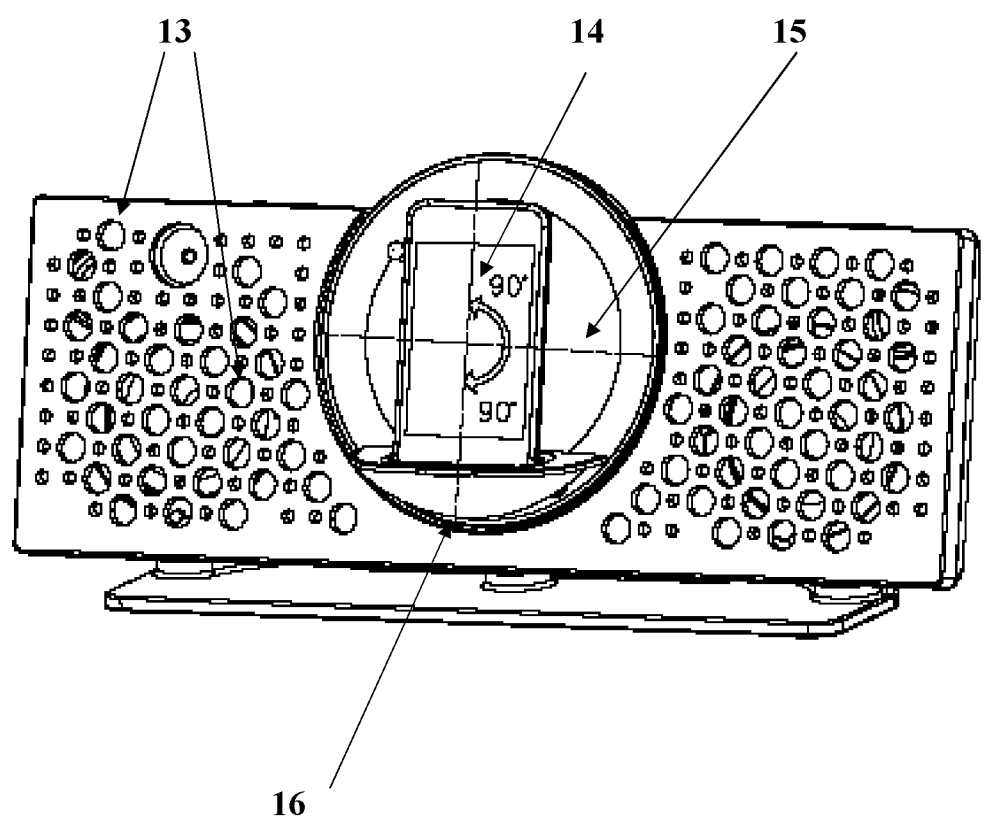
FIG. 7 is a representation of an embodiment of the present invention in which a speaker grill is displayed.

FIG. 7 is a representation of an embodiment of the present invention that shows a portable electronic device in engagement with a support base for the engagement element 16. The landscape 14 and portrait 15 axes of the portable electronic device are shown for reference. The device may, for example, be rotated about ninety degrees counterclockwise to a landscape orientation. Also shown are the grill holes 13 through which sound travels from the speaker so as to improve its quality. When in use, the grill holes may be covered by for example a mesh covering.

Figure 8:
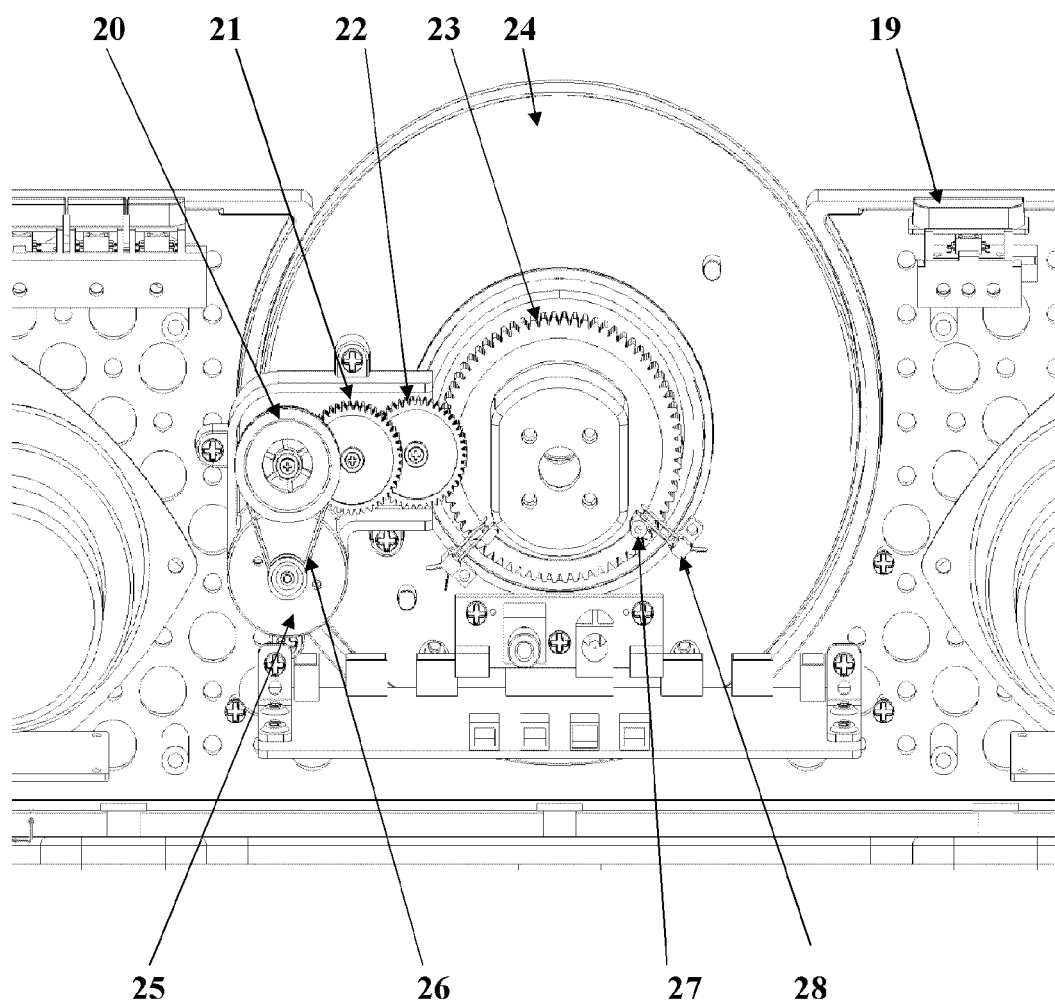
FIG. 8 is a representation of a rotation mechanism of an embodiment of the present invention.

FIG. 8 is a representation of an example of a rotation mechanism of the present invention. Thus, it shows the internal portion of the docking stations. The rotation mechanism may be activated by depressing an input button 19 that is operably coupled to and capable of activating a motor 25 that through the turning of a rubber band 26, causes a first gear 20 to turn, which turns a second gear 21, which turns a third gear 22, which turns a fourth gear 23, which is connected to and thereby able to cause turning of the turning table 24. The turning table, upon activation, will turn until the stop rod 27 reaches the stop pin 28. The use of stop rods and pins are well-known to persons of ordinary skill in the art. A reciprocal mechanism controls turning in the other direction. Not shown, but on the other side of the turning wheel is where the portable electronic device rests when engaged by the engagement element.

By way of further example, in some embodiments, the docking station may be approximately 30 cm to approximately 50 cm long at its longest point (side to side); approximately 8 cm to about approximately 12 cm at is widest point (front to back), and approximately 16 cm to approximately 20 cm at its highest point (top to bottom). The turning table, which is the part of the rotation element that may rotate or around which the portable electronic device is rotated may, for example, have a diameter of 13-16 cm or 14-15 cm. When the device is not in use, the engagement element may be located at a lower segment of the turning table and adjacent to a face of the turning table in a segment that is defined by a circle chord that is approximately 8 cm to approximately 12 cm in length. There may also be a support post (stabilization element) that is protrudes approximately 1 cm to approximately 3 cm from the face of the turning table.

Along the top of the device there may for example be controls that include one or more input mechanisms that permit control of rotation, volume, power, auxiliary activation and lights. By activating the rotation feature, one may cause rotation to occur. When there are only two possible states, pressing the rotate button once will cause the rotation mechanism to cause rotation to be effectuated to the position that the device doesn't occupy before activation. When there are more than two rotation stop positions, a single button can function to effectuate movement to the next state or the device can be configured such that continuous depression of the button causes movement.

An auxiliary activation feature may serve to enable activation of the connection with the portable electronic device. For example, the docking station may be configured such that until that auxiliary activation input is activated, the communication link does not become active. In other embodiments, there may be no auxiliary activation button, and the communication link becomes active if engaged between the portable electronic device and the docking station.

As a person of ordinary skill in the art will recognize, to use various embodiments of the present invention a user could, for example, turn on his portable electronic device, insert the device into the engagement element, activate the rotation mechanism and cause music videos to play. Because the device will have been rotated 90 degrees, the video images will be in landscape format. Furthermore, in appropriately configured devices light displays will appear around the circumference of the turn table that reflects the beat of the music.

What is claimed:

1. A docking station for a portable electronic device wherein said docking station comprises:
   a. an engagement element, wherein said engagement element is capable of engaging said portable electronic device;
   b. a rotation mechanism comprising a motor capable of rotating said portable electronic device around an axis substantially perpendicular to a support base of said docking station without disassociating the portable electronic device from said engagement element; and
   c. a stabilization element for stabilizing said portable electronic device and preventing said portable electronic device from disengaging from said engagement element during rotation.

2. The docking station according to claim 1, wherein said rotation mechanism is capable of rotating said portable electronic from a first position to second position, where said second position is 90 degrees from said first position.

3. The docking station according to claim 1 further comprising rotation activation element.

4. The docking station according to claim 1 further comprising a light illumination element.

5. The docking station according to claim 1 further comprising a speaker.

6. The docking station according to claim 1 further comprising a communication interface, wherein said communication interface permits the exchange of information between the docking station and the portable electronic device.

7. The docking station according to claim 1, wherein said portable electronic device is capable of displaying a visual image.

8. The docking station according to claim 1, wherein said portable electronic device is capable of playing an audio file.

9. The docking station according to claim 1 further comprising a clock display.

* * * * *